(12) United States Patent
Adams

(10) Patent No.: US 8,331,199 B2
(45) Date of Patent: *Dec. 11, 2012

(54) ELECTRONIC DEVICE AND METHOD OF CONTROLLING REMINDER NOTIFICATIONS

(75) Inventor: Neil Adams, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/186,103

(22) Filed: Jul. 19, 2011

(65) Prior Publication Data

US 2011/0273281 A1 Nov. 10, 2011

Related U.S. Application Data

(63) Continuation of application No. 12/901,184, filed on Oct. 8, 2010, now Pat. No. 8,018,795, which is a continuation of application No. 12/030,534, filed on Feb. 13, 2008, now Pat. No. 7,839,723.

(51) Int. Cl.
*G04B 47/00* (2006.01)
*G04B 19/24* (2006.01)
*G06Q 10/00* (2012.01)
*G06F 15/16* (2006.01)
*G06F 17/00* (2006.01)

(52) U.S. Cl. ........... 368/10; 368/29; 705/7.18; 709/206; 709/217; 715/230; 715/753

(58) Field of Classification Search ............. 368/10, 368/12, 28, 29, 46, 47, 73, 74, 13; 705/5, 705/6, 7.13, 7.18–7.21, 9; 709/205–207, 709/217–210; 715/230, 752–753

See application file for complete search history.

(56) References Cited

U.S. PATENT DOCUMENTS

| | | | |
|---|---|---|---|
| 6,462,660 B1 | 10/2002 | Cannon et al. |
| 7,188,073 B1 | 3/2007 | Tam et al. |
| 7,334,000 B2 | 2/2008 | Chhatrapati et al. |
| 7,447,989 B2 | 11/2008 | Rousselle et al. |
| 2002/0143564 A1 | 10/2002 | Webb et al. |
| 2003/0171973 A1 | 9/2003 | Wilce et al. |
| 2004/0142711 A1 | 7/2004 | Mahonen et al. |
| 2004/0243547 A1 | 12/2004 | Chhatrapati et al. |
| 2006/0150175 A1 | 7/2006 | Etelapera |
| 2006/0199611 A1 | 9/2006 | Eskelinen |
| 2006/0203620 A1 | 9/2006 | Bedingfield, Sr. |
| 2006/0224988 A1 | 10/2006 | Bedingfield, Sr. |
| 2006/0252435 A1 | 11/2006 | Henderson et al. |
| 2007/0061408 A1 | 3/2007 | Saras |
| 2007/0219874 A1 | 9/2007 | Toulotte |

OTHER PUBLICATIONS

European Search Report dated Nov. 4, 2008, from European Patent Application No. 08151393.9.

*Primary Examiner* — Vit W Miska
(74) *Attorney, Agent, or Firm* — Richard A. Johnson; Borden Ladner Gervais LLP

(57) ABSTRACT

A method of controlling reminders for an electronic calendar event record includes: displaying a reminder notification at a first electronic device, the reminder notification associated with the calendar event record, displaying an option at the first electronic device for taking a first action at the first electronic device, sending an update command for a second electronic device, the update command for taking a second action at the second electronic device in response to receipt of selection of the option at the first electronic device the first action differing from the second action.

13 Claims, 11 Drawing Sheets

ELECTRONIC DEVICE AND METHOD OF CONTROLLING REMINDER NOTIFICATIONS

CROSS REFERENCE TO RELATED APPLICATIONS

This application is a Continuation application from U.S. patent application Ser. No. 12/901,184, filed Oct. 8, 2010, which is a Continuation application from U.S. patent application Ser. No. 12/030,534, filed Feb. 13, 2008, which are incorporated herein by reference in their entirety.

TECHNICAL FIELD

The present application relates to control of electronic reminders in electronic devices.

BACKGROUND DISCUSSION

Portable electronic devices including, for example, smart telephones and wireless PDAs are becoming increasingly common and typically integrate functions of personal information management such as calendaring and data communications such as e-mail, World Wide Web browsing and telecommunications in a single device. Such devices run on a wide variety of networks from data-only networks such as Mobitex and DataTAC to complex voice and data networks such as GSM/GPRS, CDMA, EDGE, UMTS and CDMA2000 networks.

Users commonly store calendar event details such as meeting particulars at the portable electronic device for display in an electronic calendar view on the device. Such a device is normally synchronized with another computing device such as a user's desktop computer for maintaining a complete record of calendar events at both the portable electronic device and the other computing device. Therefore calendar records from the portable electronic device are also stored at the other computing device and, similarly, calendar records from the other computing device are also stored at the portable electronic device. The storage of calendar records at either of the devices is convenient as it permits the user to be provided with electronic reminders at the portable electronic device, for example, when away from their desktop computer. When an electronic calendar reminder is set for a scheduled calendar event, electronic reminders are generated at both the portable electronic device and the other computing device, such as a desktop computer. Thus, the user is provided with multiple calendar reminder notifications at both the portable electronic device and at the desktop computer for the same calendar event.

Improvements in control of electronic reminders are desirable.

BRIEF DESCRIPTION OF THE DRAWINGS

Embodiments of the present application will now be described, by way of example only, with reference to the attached Figures, wherein:

FIG. 4 is a block diagram illustrating components of an exemplary configuration of a host system that the portable electronic device can communicate with;

FIGS. 7 to 15 show exemplary screen shots in a method of controlling electronic reminders for calendar events.

DETAILED DESCRIPTION

Figure 1:
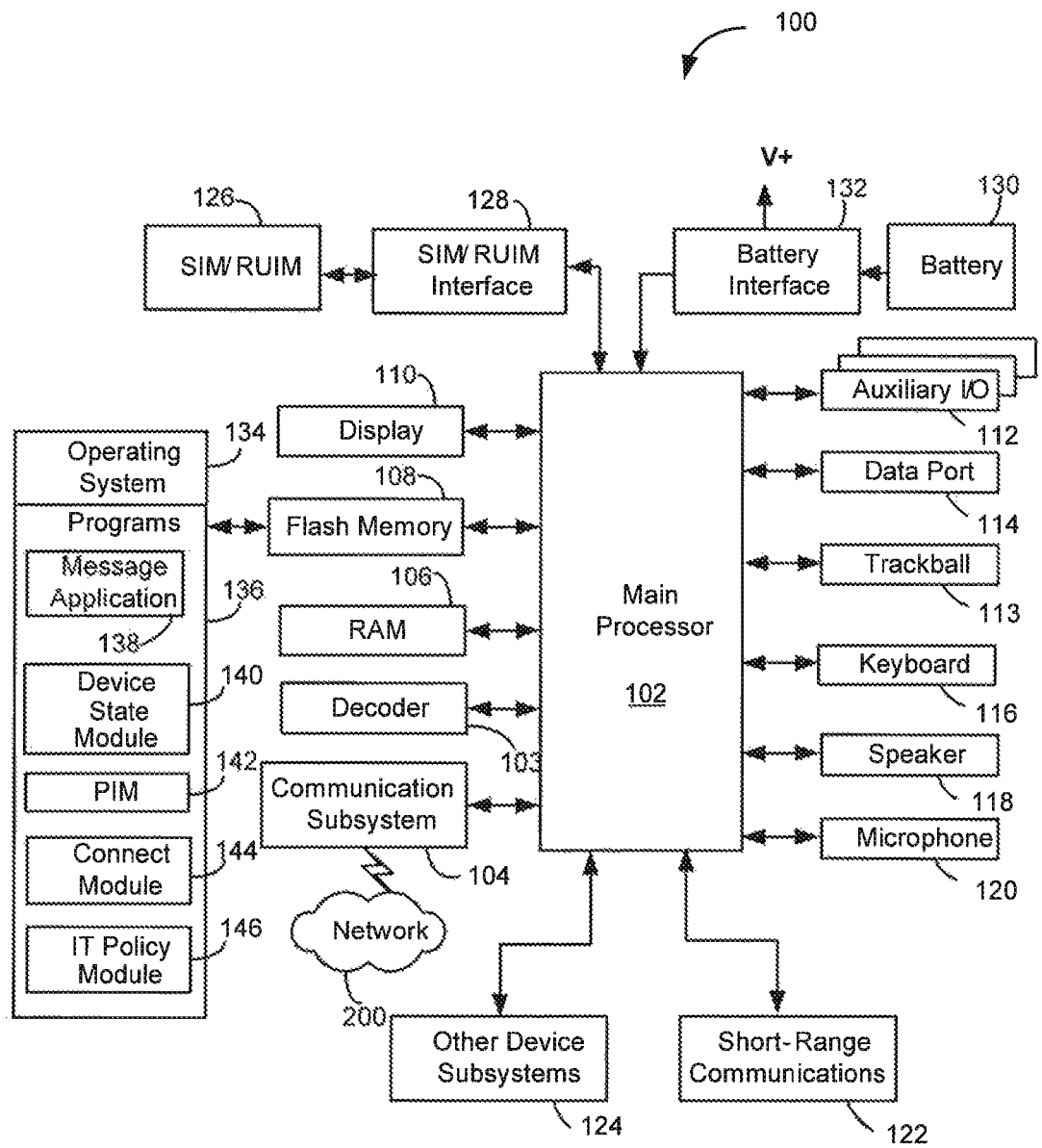
FIG. 1 is a block diagram of an exemplary embodiment of a portable electronic device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to a portable electronic device. Examples of portable electronic devices include mobile or handheld wireless communication devices such as pagers, cellular phones, cellular smartphones, wireless organizers, personal digital assistants, computers, laptops, handheld wireless communication devices, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). To aid the reader in understanding the structure of the portable electronic device and how it communicates with other devices and host systems, reference will now be made to FIGS. 1 through 4.

Referring first to FIG. 1, shown therein is a block diagram of an exemplary embodiment of a portable electronic device 100. The portable electronic device 100 includes a number of components such as a main processor 102 that controls the overall operation of the portable electronic device 100. Communication functions, including data and voice communications, are performed through a communication subsystem 104. Data received by the portable electronic device 100 can be decompressed and decrypted by a decoder 103, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 104 receives messages from and sends messages to a wireless network 200. In this exemplary embodiment of the portable electronic device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with portable electronic device 100 is a GSM/GPRS wireless network in one exemplary implementation, other wireless networks may also be associated with the portable electronic device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks such as EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The main processor 102 also interacts with additional subsystems such as a Random Access Memory (RAM) 106, a flash memory 108, a display 110, an auxiliary input/output (I/O) subsystem 112, a data port 114, a trackball 113, a keyboard 116, a speaker 118, a microphone 120, short-range communications 122 and other device subsystems 124.

Some of the subsystems of the portable electronic device 100 perform communication-related functions, whereas other subsystems may provide "resident" or on-device functions. By way of example, the display 110, the trackball 113 and the keyboard 116 may be used for both communication-related functions, such as entering a text message for transmission over the network 200, and device-resident functions such as a calculator or task list.

The portable electronic device 100 can send and receive communication signals over the wireless network 200 after network registration or activation procedures have been completed. Network access is associated with a subscriber or user of the portable electronic device 100. To identify a subscriber, a SIM/RUIM card 126 (i.e. Subscriber Identity Module or a Removable User Identity Module) is inserted into a SIM/RUIM interface 128 in order to communicate with a network. The SIM card or RUIM 126 is one type of a conventional "smart card" that can be used to identify a subscriber of the portable electronic device 100 and to personalize the portable electronic device 100, among other things. In the present embodiment, the portable electronic device 100 is not fully operational for communication with the wireless network 200 without the SIM card 126. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical portable electronic device. The SIM card/RUIM 126 may store additional subscriber information for a portable electronic device as well, including datebook (or calendar) information and recent call information. Alternatively, user identification information can also be programmed into the flash memory 108.

The portable electronic device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the portable electronic device 100. Although current technology makes use of a battery, future technologies such as micro fuel cells may provide the power to the portable electronic device 100.

The portable electronic device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications are installed on the portable electronic device 100 during its manufacture. Other software applications include a message application 138 that can be any suitable software program that allows a user of the portable electronic device 100 to send and receive electronic messages. Various alternatives exist for the message application 138 as is well known to those skilled in the art. Messages that have been sent or received by the user are typically stored in the flash memory 108 of the portable electronic device 100 or some other suitable storage element in the portable electronic device 100. In at least some embodiments, some of the sent and received messages may be stored remotely from the device 100 such as in a data store of an associated host system that the portable electronic device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the portable electronic device 100 is turned off or loses power.

The PIM 142 includes functionality for organizing and managing data items of interest to the user, such as, but not limited to, e-mail, contacts, calendar events, voice mails, appointments, and task items. PIM applications include, for example, calendar, address book, tasks and memo applications. The PIM applications have the ability to send and receive data items via the wireless network 200. PIM data items may be seamlessly integrated, synchronized, and updated via the wireless network 200 with the portable electronic device subscriber's corresponding data items stored and/or associated with a host computer system. This functionality creates a mirrored host computer on the portable electronic device 100 with respect to such items. This can be particularly advantageous when the host computer system is the portable electronic device subscriber's office computer system.

The portable electronic device 100 also includes a connect module 144, and an information technology (IT) policy module 146. The connect module 144 implements the communication protocols that are required for the portable electronic device 100 to communicate with the wireless infrastructure and any host system, such as an enterprise system, that the portable electronic device 100 is authorized to interface with. Examples of a wireless infrastructure and an enterprise system are given in FIGS. 3 and 4, which are described in more detail below.

The connect module 144 includes a set of APIs that can be integrated with the portable electronic device 100 to allow the portable electronic device 100 to use any number of services associated with the enterprise system. The connect module 144 allows the portable electronic device 100 to establish an end-to-end secure, authenticated communication pipe with the host system. A subset of applications for which access is provided by the connect module 144 can be used to pass IT policy commands from the host system to the portable electronic device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the portable electronic device 100. These software applications can be third party applications, which are added after the manufacture of the portable electronic device 100. Examples of third party applications include games, calculators, utilities, etc.

The additional applications can be loaded onto the portable electronic device 100 through at least one of the wireless network 200, the auxiliary I/O subsystem 112, the data port 114, the short-range communications subsystem 122, or any other suitable device subsystem 124. This flexibility in application installation increases the functionality of the portable electronic device 100 and may provide enhanced on-device functions, communication-related functions, or both. For example, secure communication applications may enable electronic commerce functions and other such financial transactions to be performed using the portable electronic device 100.

The data port 114 enables a subscriber to set preferences through an external device or software application and extends the capabilities of the portable electronic device 100 by providing for information or software downloads to the portable electronic device 100 other than through a wireless communication network. The alternate download path may, for example, be used to load an encryption key onto the portable electronic device 100 through a direct and thus reliable and trusted connection to provide secure device communication.

The data port 114 can be any suitable port that enables data communication between the portable electronic device 100 and another computing device. The data port 114 can be a serial or a parallel port. In some instances, the data port 114 can be a USB port that includes data lines for data transfer and a supply line that can provide a charging current to charge the battery 130 of the portable electronic device 100.

The short-range communications subsystem 122 provides for communication between the portable electronic device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, Web page download, or any other information is processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the portable electronic device 100 is substantially similar, except that the received signals are output to the speaker 118, and signals for transmission are generated by the microphone 120. Alternative voice or audio I/O subsystems, such as a voice message recording subsystem, can also be implemented on the portable electronic device 100. Although voice or audio signal output is accomplished primarily through the speaker 118, the display 110 can also be used to provide additional information such as the identity of a calling party, duration of a voice call, or other voice call related information.

Figure 2:
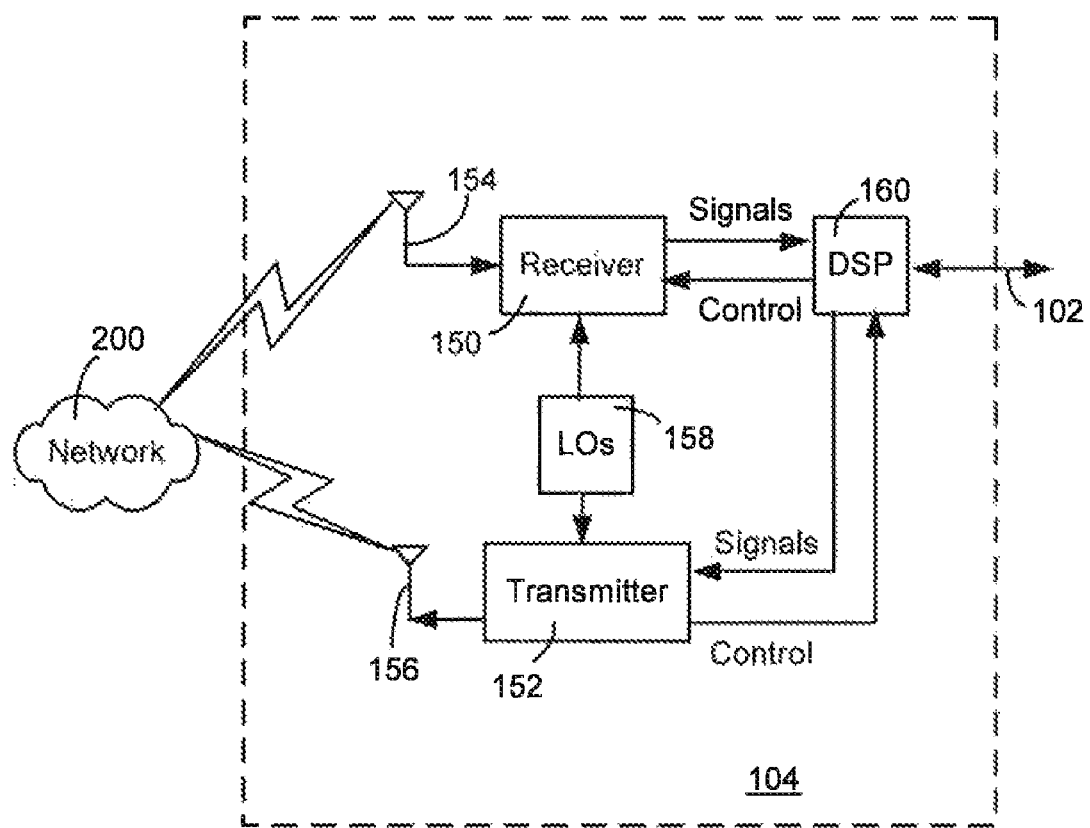
FIG. 2 is an exemplary block diagram of a communication subsystem component of FIG. 1.

Referring now to FIG. 2, an exemplary block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the portable electronic device 100 is intended to operate. Thus, it should be understood that the design illustrated in FIG. 2 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. ND conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the portable electronic device 100 and the wireless network 200 can contain one or more different channels, typically different RF channels, and associated protocols used between the portable electronic device 100 and the wireless network 200. An RF channel is a limited resource that should be conserved, typically due to limits in overall bandwidth and limited battery power of the portable electronic device 100.

When the portable electronic device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 3:
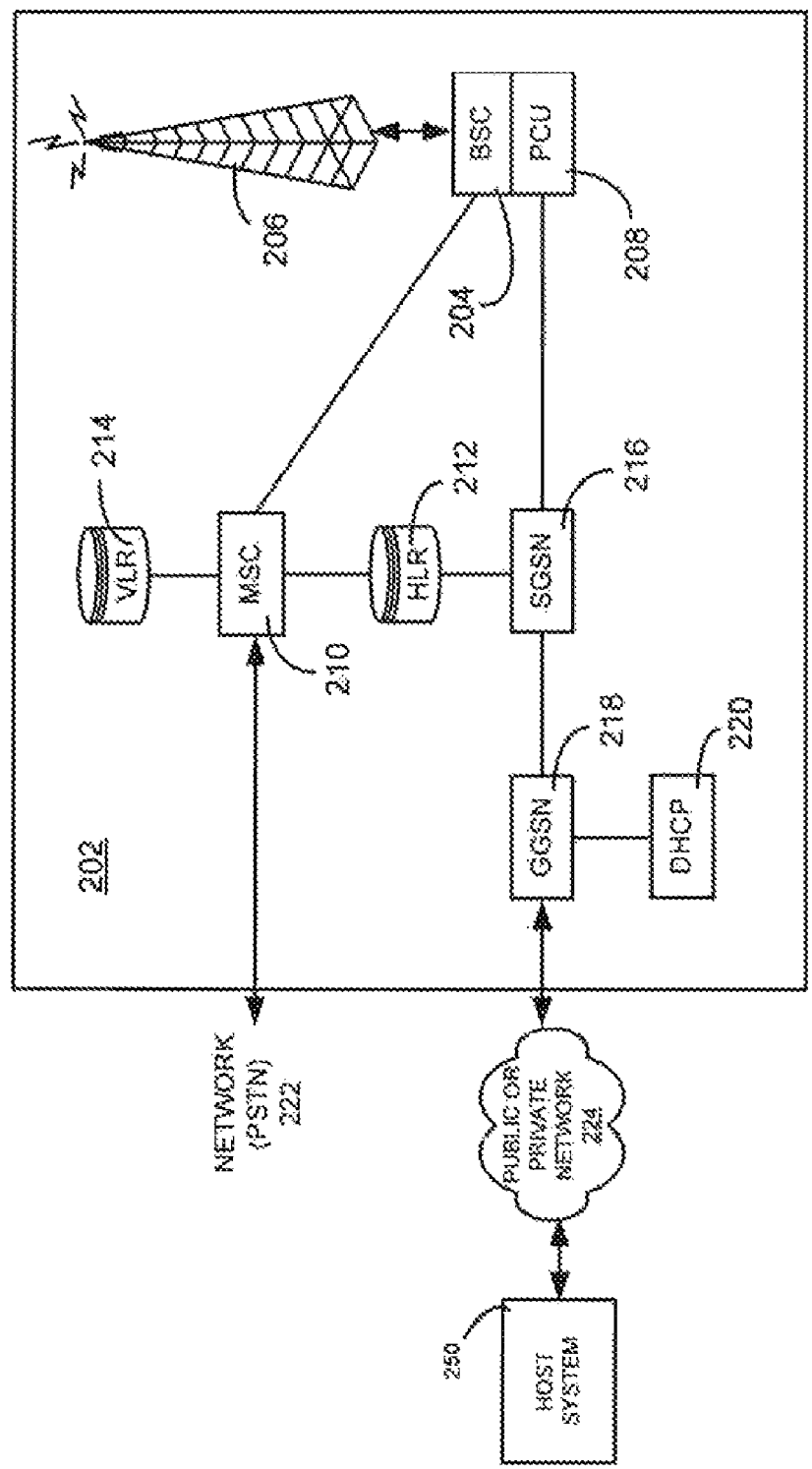
FIG. 3 is a block diagram of an exemplary implementation of a node of a wireless network.

Referring now to FIG. 3, a block diagram of an exemplary implementation of a node 202 of the wireless network 200 is shown. In practice, the wireless network 200 comprises one or more nodes 202. In conjunction with the connect module 144, the portable electronic device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable portable electronic devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the portable electronic device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from portable electronic devices within its cell via the station 206. The fixed transceiver equipment normally performs such functions as modulation and possibly encoding and/or encryption of signals to be transmitted to the portable electronic device 100 in accordance with particular, usually predetermined, communication protocols and parameters, under control of its controller. The fixed transceiver equipment similarly demodulates and possibly decodes and decrypts, if necessary, any communication signals received from the portable electronic device 100 within its cell. Communication protocols and parameters may vary between different nodes. For example, one node may employ a different modulation scheme and operate at different frequencies than other nodes.

For all portable electronic devices 100 registered with a specific network, permanent configuration data such as a user profile is stored in the HLR 212. The HLR 212 also contains location information for each registered portable electronic device and can be queried to determine the current location of a portable electronic device. The MSC 210 is responsible for a group of location areas and stores the data of the portable electronic devices currently in its area of responsibility in the VLR 214. Further, the VLR 214 also contains information on portable electronic devices that are visiting other networks. The information in the VLR 214 includes part of the permanent portable electronic device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each portable electronic device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given portable electronic device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a portable electronic device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each portable electronic device 100 must be assigned to one or more APNs and portable electronic devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a portable electronic device 100 is not using its PDP Context, the PDP Context can be de-allocated and the IP address returned to the IP address pool managed by the DHCP server 220.

Figure 4:
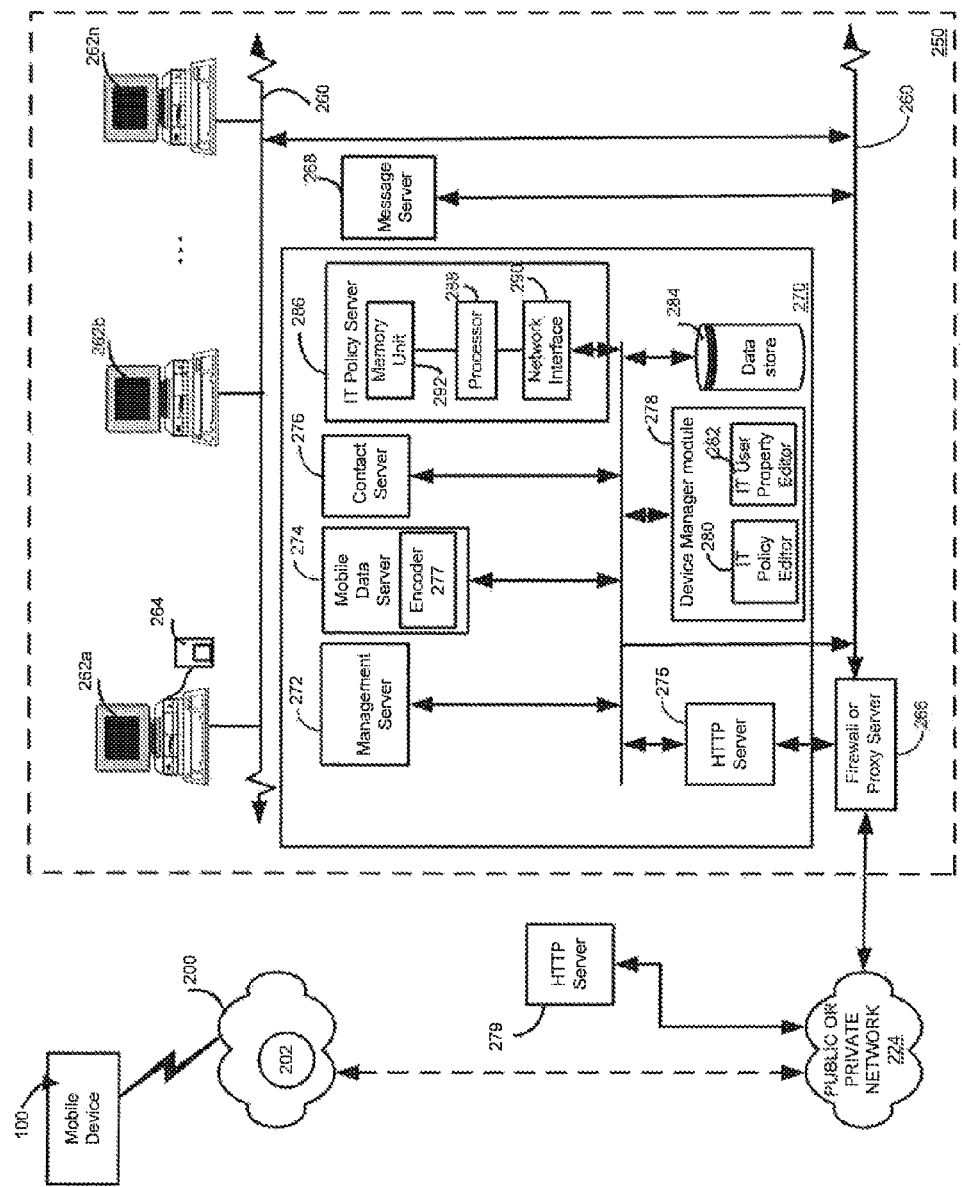

Referring now to FIG. 4, shown therein is a block diagram illustrating components of an exemplary configuration of a host system 250 that the portable electronic device 100 can communicate with in conjunction with the connect module 144. The host system 250 will typically be a corporate enterprise or other local area network (LAN), but may also be a home office computer or some other private system, for example, in variant implementations. In this example shown in FIG. 4, the host system 250 is depicted as a LAN of an organization to which a user of the portable electronic device 100 belongs. Typically, a plurality of portable electronic devices can communicate wirelessly with the host system 250 through one or more nodes 202 of the wireless network 200.

The host system 250 comprises a number of network components connected to each other by a network 260. For instance, a user's desktop computer 262*a* with an accompanying cradle 264 for the user's portable electronic device 100 is situated on a LAN connection. The cradle 264 for the portable electronic device 100 can be coupled to the computer 262*a* by a serial or a Universal Serial Bus (USB) connection, for example. Other user computers 262*b*-262*n* are also situated on the network 260, and each may or may not be equipped with an accompanying cradle 264. The cradle 264 facilitates the loading of information (e.g. PIM data, private symmetric encryption keys to facilitate secure communications) from the user computer 262*a* to the portable electronic device 100, and may be particularly useful for bulk information updates often performed in initializing the portable electronic device 100 for use. The information downloaded to the portable electronic device 100 may include certificates used in the exchange of messages.

It will be understood by persons skilled in the art that the user computers 262*a*-262*n* will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 can comprise additional components that are not explicitly shown in FIG. 4 for this exemplary configuration. More generally, the host system 250 may represent a smaller part of a larger network (not shown) of the organization, and may comprise different components and/or be arranged in different topologies than that shown in the exemplary embodiment of FIG. 4.

To facilitate the operation of the portable electronic device 100 and the wireless communication of messages and message-related data between the portable electronic device 100 and components of the host system 250, a number of wireless communication support components 270 can be provided. In some implementations, the wireless communication support components 270 can include a management server 272, a mobile data server (MDS) 274, a web server, such as Hypertext Transfer Protocol (HTTP) server 275, a contact server 276, and a device manager module 278. HTTP servers can also be located outside the enterprise system, as indicated by the HTTP server 275 attached to the network 224. The device manager module 278 includes an IT Policy editor 280 and an IT user property editor 282, as well as other software components for allowing an IT administrator to configure the portable electronic devices 100. In an alternative embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the portable electronic devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this exemplary embodiment, the portable electronic device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the portable electronic device 100. The wireless VPN router allows a VPN connection to be established directly through a specific wireless network to the portable electronic device 100. The wireless VPN router can be used with the Internet Protocol (IP) Version 6 (IPV6) and IP-based wireless networks. This protocol can provide enough IP addresses so that each portable electronic device has a dedicated IP address, making it possible to push information to a portable electronic device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the portable electronic device 100 in this alternative implementation.

Messages intended for a user of the portable electronic device 100 are initially received by a message server 268 of the host system 250. Such messages may originate from any number of sources. For instance, a message may have been sent by a sender from the computer 262*b* within the host system 250, from a different portable electronic device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268.

Some exemplary implementations of the message server 268 include a Microsoft Exchange™ server, a Lotus Domino™ server, a Novell Groupwise™ server, or another suitable mail server installed in a corporate environment. In some implementations, the host system 250 may comprise multiple message servers 268. The message server provides additional functions including calendaring, contacts and tasks and supports data storage.

When messages are received by the message server 268, they are typically stored in a data store associated with the message server 268. In at least some embodiments, the data store may be a separate hardware unit, such as data store 284, that the message server 268 communicates with. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262a. The data store associated with the message server 268 can store copies of each message that is locally stored on the portable electronic device 100. Alternatively, the data store associated with the message server 268 can store all of the messages for the user of the portable electronic device 100 and only a smaller number of messages can be stored on the portable electronic device 100 to conserve memory. For instance, the most recent messages (i.e. those received in the past two to three months for example) can be stored on the portable electronic device 100.

When operating the portable electronic device 100, the user may wish to have e-mail messages retrieved for delivery to the portable electronic device 100. The message application 138 operating on the portable electronic device 100 may also request messages associated with the user's account from the message server 268. The message application 138 may be configured (either by the user or by an administrator, possibly in accordance with an organization's IT policy) to make this request at the direction of the user, at some pre-defined time interval, or upon the occurrence of some pre-defined event. In some implementations, the portable electronic device 100 is assigned its own e-mail address, and messages addressed specifically to the portable electronic device 100 are automatically redirected to the portable electronic device 100 as they are received by the message server 268.

The management server 272 can be used to specifically provide support for the management of, for example, messages, such as e-mail messages, that are to be handled by portable electronic devices. Generally, while messages are still stored on the message server 268, the management server 272 can be used to control when, if, and how messages are sent to the portable electronic device 100. The management server 272 also facilitates the handling of messages composed on the portable electronic device 100, which are sent to the message server 268 for subsequent delivery.

For example, the management server 272 may monitor the user's "mailbox" (e.g. the message store associated with the user's account on the message server 268) for new e-mail messages, and apply user-definable filters to new messages to determine if and how the messages are relayed to the user's portable electronic device 100. The management server 272 may also, through an encoder 273, compress messages, using any suitable compression technology (e.g. YK compression, and other known techniques) and encrypt messages (e.g. using an encryption technique such as Data Encryption Standard (DES), Triple DES, or Advanced Encryption Standard (AES)), and push them to the portable electronic device 100 via the shared network infrastructure 224 and the wireless network 200. The management server 272 may also receive messages composed on the portable electronic device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the portable electronic device 100 can be defined (e.g. by an administrator in accordance with IT policy) and enforced by the management server 272. These may include whether the portable electronic device 100 may receive encrypted and/or signed messages, minimum encryption key sizes, whether outgoing messages must be encrypted and/or signed, and whether copies of all secure messages sent from the portable electronic device 100 are to be sent to a pre-defined copy address, for example.

The management server 272 may also be adapted to provide other control functions, such as only pushing certain message information or pre-defined portions (e.g. "blocks") of a message stored on the message server 268 to the portable electronic device 100. For example, in some cases, when a message is initially retrieved by the portable electronic device 100 from the message server 268, the management server 272 may push only the first part of a message to the portable electronic device 100, with the part being of a pre-defined size (e.g. 2 KB). The user can then request that more of the message be delivered in similar-sized blocks by the management server 272 to the portable electronic device 100, possibly up to a maximum pre-defined message size. Accordingly, the management server 272 facilitates better control over the type of data and the amount of data that is communicated to the portable electronic device 100, and can help to minimize potential waste of bandwidth or other resources.

The MDS 274 encompasses any other server that stores information that is relevant to the corporation. The mobile data server 274 may include, but is not limited to, databases, online data document repositories, customer relationship management (CRM) systems, or enterprise resource planning (ERP) applications. The MDS 274 can also connect to the Internet or other public network, through HTTP server 275 or other suitable web server such as an File Transfer Protocol (FTP) server, to retrieve HTTP webpages and other data. Requests for webpages are typically routed through MDS 274 and then to HTTP server 275, through suitable firewalls and other protective mechanisms. The web server then retrieves the webpage over the Internet, and returns it to MDS 274. As described above in relation to management server 272, MDS 274 is typically provided, or associated, with an encoder 277 that permits retrieved data, such as retrieved webpages, to be compressed, using any suitable compression technology (e.g. YK compression, and other known techniques), and encrypted (e.g. using an encryption technique such as DES, Triple DES, or AES), and then pushed to the portable electronic device 100 via the shared network infrastructure 224 and the wireless network 200.

The contact server 276 can provide information for a list of contacts for the user in a similar fashion as the address book on the portable electronic device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the management server 272, the MDS 274, the HTTP server 275, the contact server 276, the device manager module 278, the data store 284 and the IT policy server 286 do not need to be implemented on separate physical servers within the host system 250. For example, some or all of the functions associated with the management server 272 may be integrated with the message server 268, or some other server in the host system 250. Alternatively, the host system 250 may comprise multiple management servers 272, particularly in variant implementations where a large number of portable electronic devices need to be supported.

The device manager module 278 provides an IT administrator with a graphical user interface with which the IT administrator interacts to configure various settings for the portable electronic devices 100. As mentioned, the IT administrator can use IT policy rules to define behaviors of certain applications on the portable electronic device 100 that are permitted such as phone, web browser or Instant Messenger use. The IT policy rules can also be used to set specific values for configuration settings that an organization requires on the portable electronic devices 100 such as auto signature text, WLAN/VoIP/VPN configuration, security requirements (e.g. encryption algorithms, password rules, etc.), specifying themes or applications that are allowed to run on the portable electronic device 100, and the like.

Figure 5:
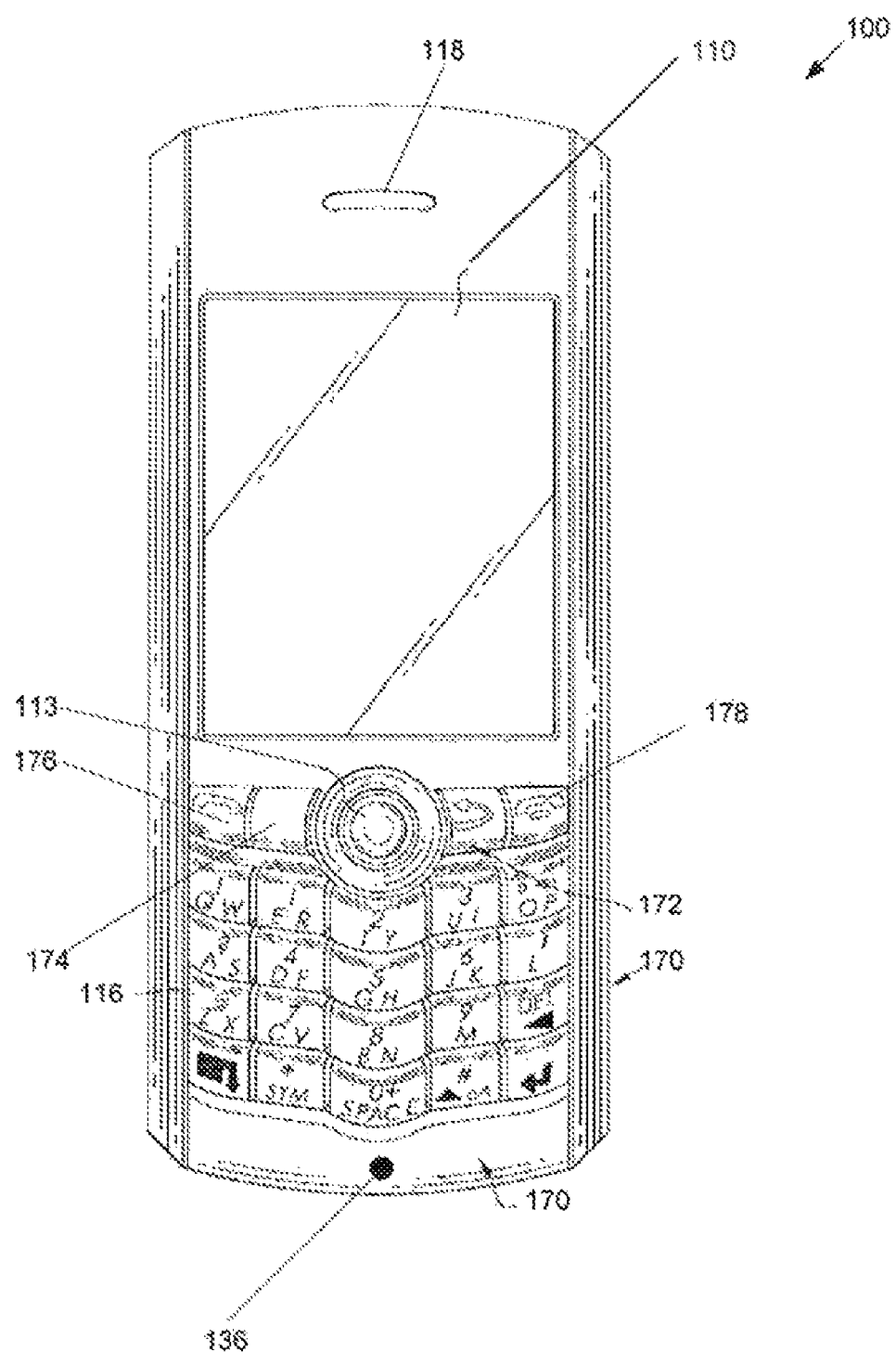
FIG. 5 is an exemplary portable electronic device according to one embodiment.

Reference is now made to FIG. 5 to describe an exemplary portable electronic device 100 in accordance with an embodiment. The exemplary portable electronic device 100 includes a housing 170 that frames the display 110 (an LCD display 110), the speaker 118, the trackball 113, the keyboard 116, and the microphone 136. The trackball 113 can be rolled within a socket for user-input and can be inwardly depressed as a means for providing additional user-input. The keyboard 116 includes input keys such as an exit key 172, a menu key 174, an initiate call key 176 and an end call key 178. The housing 170 is made from a suitable material as will occur to those skilled in the art and can be stored, for example, in a holster (not shown) that includes an attachment for attaching to a user's belt.

It will be appreciated that the present application is not limited to the portable electronic device 100 shown in FIG. 5 and many other electronic devices are possible as indicated hereinabove. Further, features of the electronic device can vary from those shown in the exemplary portable electronic device 100 of FIG. 5. For example, a trackwheel can be included rather than the trackball 113. In another alternative, the electronic device can include a touchscreen for user input. Many other features can vary as will be appreciated by those skilled in the art.

A method of controlling reminders for an electronic calendar event record includes generating a reminder notification at a first electronic device such as the portable electronic device 100. The reminder notification is associated with the calendar event record. A selectable option for taking a first action at the first electronic device and taking a second action at a second electronic device, such as a user's desktop computer, is generated. The first action differs from the second action. An update command is generated for taking the second action at the second electronic device and the update command is sent for the second electronic device.

Figure 6:
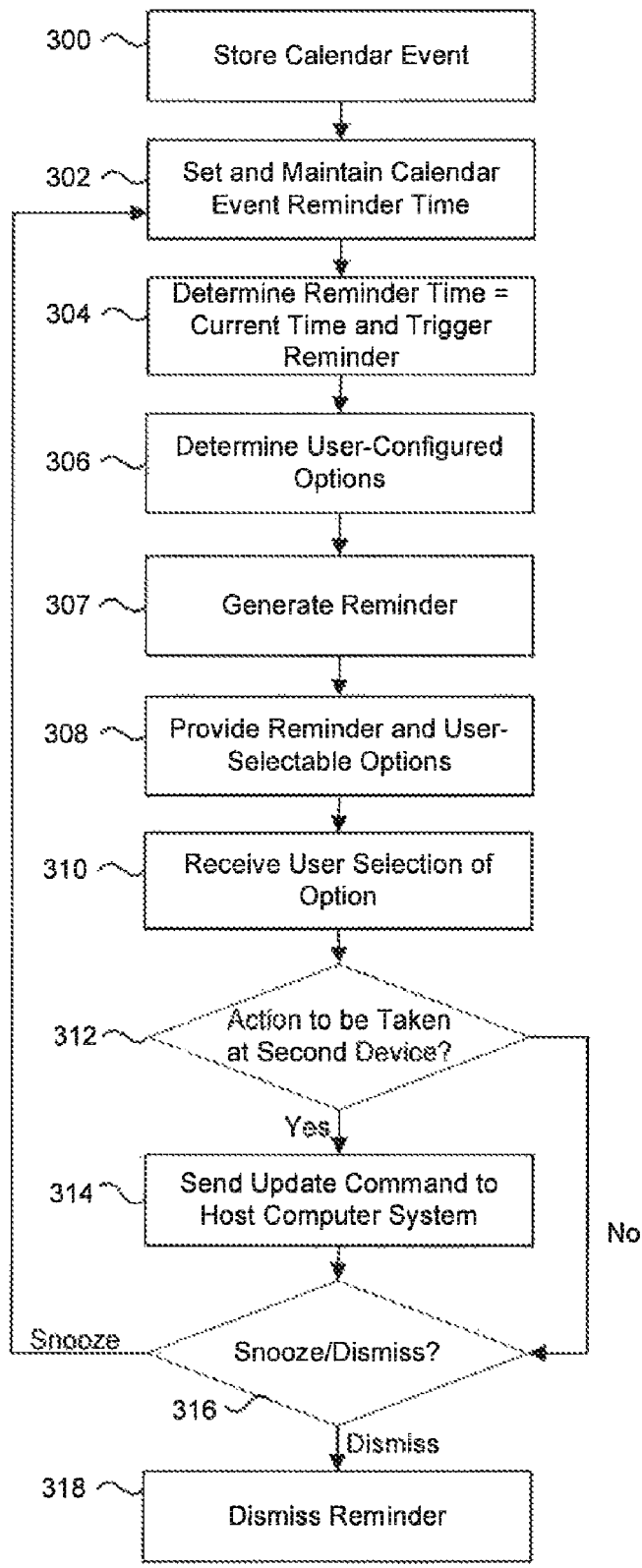
FIG. 6 is a simplified flowchart depicting steps in a method of controlling electronic reminders for calendar events according to one embodiment.

Referring now to FIG. 6, there is shown a simplified flowchart depicting steps in a method of controlling electronic reminders for calendar events according to one embodiment. It will be appreciated that each of the steps of FIG. 6 can be carried out by routines or subroutines of the software executed by the main processor. Coding of software for carrying out such steps is well within the scope of a person of ordinary skill in the art.

The calendar event record is stored in a database at the portable electronic device 100 (step 100). The calendar event record can be stored upon receipt of a save command from a calendar graphical user interface after user-entry of the calendar event details, or in response to receipt of, for example, a meeting request from another electronic device, or as a result of receipt of a calendar event record upon synchronization with another electronic device, such as the desktop computer 262*a*. Upon storage of the calendar event record, a reminder time for the calendar event is set for generation of the reminder and the setting is maintained at the portable electronic device 100 (302). When the current time according to an internal clock of the portable electronic device 100 is determined to be equal to the reminder time set at the portable electronic device 100 (step 304), the user-configurable reminder options are determined (step 306). The user-configurable reminder options include options that can be enabled or disabled and, when enabled, are provided to the user along with the reminder for user selection in a calendar graphical user interface. The reminder is generated at step 307 for the calendar event and the reminder and the user-configurable reminder options are provided (step 308). The user-selection is received at the processor 102 (step 310) and the processor 102 then determines if any action is to be taken at the user's desktop computer 262*a* (step 312). If so, the portable electronic device 100 sends a calendar event update along with a calendar event identifier to the host system 250 where it is received at the message server 268 and stored in the associated data store. The update is pushed to the mail client of the desktop computer 262*a* where the specified action (via the update) is taken. Alternatively, the mail client of the user's desktop computer can poll the data store for the updates rather than the update being pushed. The method then proceeds to step 316. If, on the other hand, it is determined that there is no action to be taken at the user's desktop computer 262*a*, the method proceeds from step 312 to step 316. The processor 102 then determines what action is to be taken at the portable electronic device 100 based on the option selected by the user (step 316). If the action to be taken is to snooze the reminder thereby generating the reminder again later, the method returns to step 302 where the calendar event reminder time is set based on the snooze time. If, on the other hand, the action to be taken is to dismiss the reminder, the method proceeds to step 318 where the reminder is dismissed.

Continued reference is made to FIG. 6 and to FIGS. 7 to 14 to describe an exemplary method of controlling electronic reminders for calendar events according to one embodiment. It will be appreciated that the following example is provided for the purpose of illustration only and is not intended to be limiting. FIGS. 7 to 14 show exemplary screen shots in a method of controlling electronic reminders for calendar events.

Figure 7:
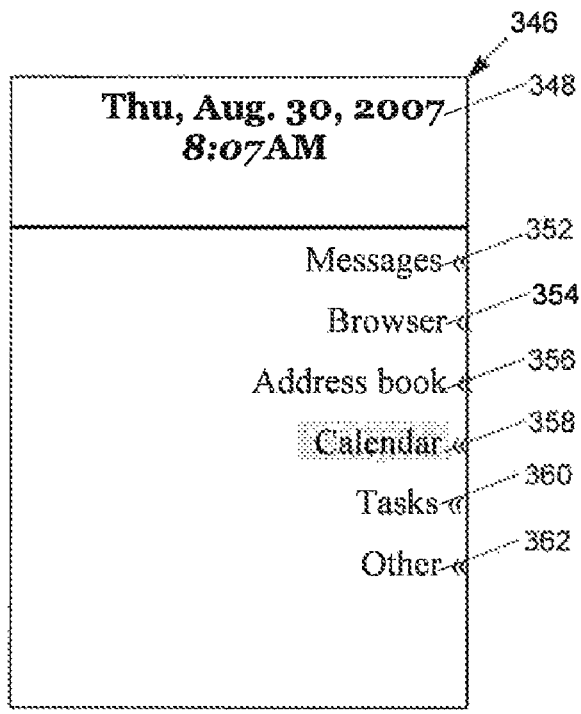

A calendar event record is either created or sent to the portable electronic device 100 for storage. As indicated, the calendar event record can be stored upon receipt of a save command from a calendar graphical user interface after user-entry of the calendar event details. Referring to FIG. 7, there is shown an exemplary menu screen 346 that is displayed on the display 110 of the portable electronic device 100. The exemplary menu screen includes a display clock 348 that is updated according to circuitry in the portable electronic device 100, along with a menu list 350 of applications for user-selection including an electronic mail application (Messages) 352, a Web browser application (Browser) 354, an address book application (Address Book) 356, a calendaring application (Calendar) 358, a tasks application (Tasks) 360, and others (Other) 362. Each of the displayed applications in the menu is selectable by, for example, scrolling to the desired application using the trackball 113 followed by inward depression of the trackball 113.

It will be understood that the calendar application is used for providing a graphical user interface (GUI) for user-creation of calendar event records such as appointments, or meetings, for storage of calendar event records in a database at the flash memory 108 and for viewing of calendar events on the display 110. Each calendar event record includes a variety of information as will be described further below.

Figure 8:
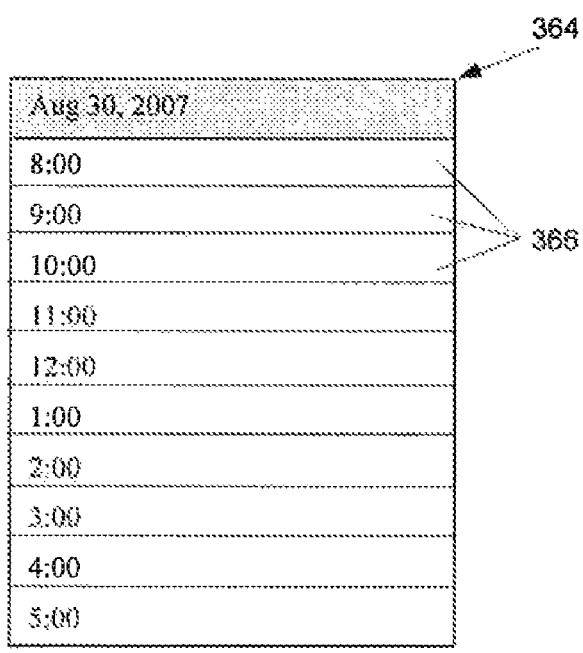

Upon user-selection of the calendar application (Calendar) 358 from the exemplary menu screen 346 of FIG. 7, the calendar application is executed resulting in the display of a default calendar view such as the calendar view shown in FIG. 8. In the example shown in FIG. 8, the default calendar view is the day view 364. It will be appreciated that other views such as a week view, a month view, or an agenda view can be displayed depending on the default view or can be selected for display. In the calendar view, calendar event records for calendar events such as meetings or appointments that are calendared within a time period that falls within the calendar view and are stored in the flash memory 108, are displayed on the display 110. In the present example, there are no calendar event records stored in the flash memory 108 and thus, no calendar events are displayed in the time periods 366 shown (between 8:00 a.m. and 5:00 p.m.) for the date displayed.

Figures 9, 10:
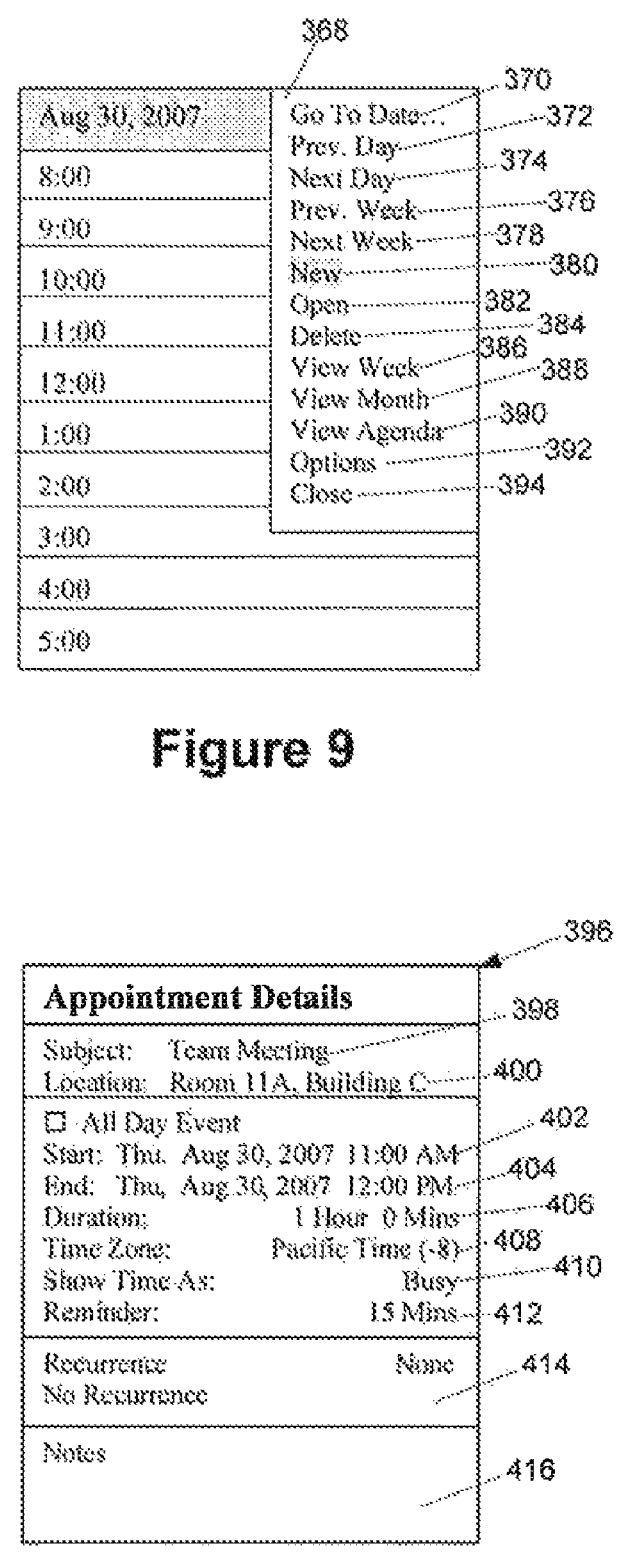

In the present example, a user wishing to add a calendar event record using the portable electronic device 100, depresses the trackball 113, causing a menu list 368 of selectable options to be displayed, such as that shown in FIG. 9. The options shown in the exemplary screen shot of FIG. 9 include, for example, "Go To Date" 370, "Prev Day" 372, "Next Day" 374, "Prev Week" 376, "Next Week" 378, "New" 380, "Open" 382, "Delete" 384, "View Week" 386, "View Month" 388, "View Agenda" 390, "Options" 392, and "Close" 394. Selection of the "Go To Date" 370 provides a user-editable date field for user-entry of a date for displaying on the display 110. Selection of the "Prev Day" option 372 results in the display of the calendar events that fall within the day prior to that displayed in FIG. 8. Similarly, selection of the "Next Day" option 374 results in the display of the calendar events that fall within the day following that displayed in the FIG. 8. Selection of the "Prev Week" option 376 results in the display of the calendar events that fall within the week prior to the day display in FIG. 8. Selection of the "Next Week" option 378 results in the display of the calendar events that fall within the week following the day displayed in FIG. 8. Selection of the "New" option 380 provides a GUI for composition of a new calendar event record for addition to the calendar display. Selection of the "Open" option 382 results in the display of details of any selected calendar event record. Selection of the "Delete" option 384 results in deletion of a selected calendar event record. Selection of the "View Week" option 386 results in the display of the calendar events that fall within the current week including the day displayed in FIG. 8. Selection of the "View Month" option 388 results in the display of the calendar events that fall within the current month including the day displayed in FIG. 8. Selection of the "View Agenda" option 390 results in the display of calendar events in an agenda list. Selection of "Options" 392 results in the display of a further submenu list of options as will be described further below. Selection of the "Close" option 394 closes the calendar application.

As indicated above, selection of the "New" option 380 for the menu list of options 368 displayed in FIG. 9 causes a new screen to be generated in the calendar GUI for composition of a new calendar event record such as that shown in FIG. 10. The exemplary GUI for composition of a new calendar event record shown in FIG. 10 includes fields for user-entry of calendar event details, most of which are populated with data. The data is entered by the user of the portable electronic device 100 using input devices such as the trackball 113 and keyboard 116. The fields in the exemplary screen shot of FIG. 10 include a "Subject" field 398, a "Location" field 400, a "Start" field 402, an "End" field 404, a "Duration" field 406, a "Time Zone" field 408, a "Show Time As" field 410, a "Reminder" field 412, a "Recurrence" field 414 and a "Notes Field" 416. In the example of FIG. 10, the calendar event details include "Team Meeting" populating the "Subject" field 398, "Room 11A, Building C" populating the "Location" field 400, Aug. 30, 2007, 11:00 AM populating the "Start" field 402, Aug. 30, 2007, 12:00 PM populating the "End" field 404, and 1 hour populating the "Duration" field 406, as indicated. The "Time Zone" field 408 is populated with "Pacific Time", the "Show Time As" field 410 is populated with "Busy" in the calendar view and a reminder is indicated for 15 minutes prior the start time of the calendar event in the "Reminder" field 412.

Figures 11, 12:
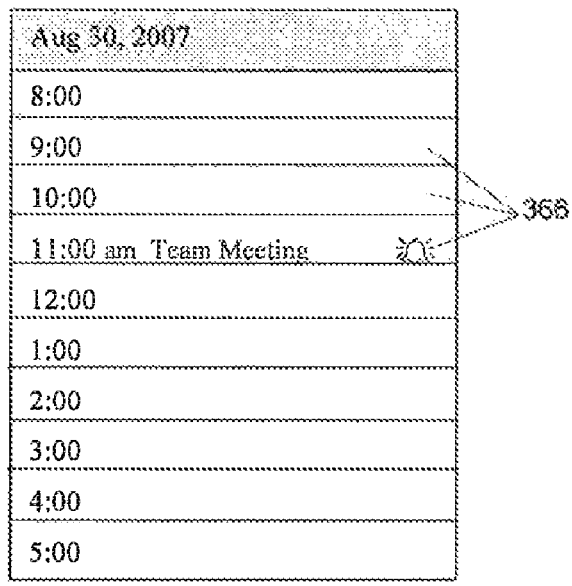

The user populates the fields of the calendar GUI for composition of a new calendar event record and, when completed, selects a "Save" option 418 from a submenu list of options 420 in the calendar GUI, as shown in FIG. 11. It will be appreciated that other options can be provided including a "Delete" option 422 for deleting the new calendar event record, an "Invite Attendee" option 424 for adding an invitee for delivery of a corresponding calendar event record to that invitee, and a "Close" option 426 to close the submenu and return to the calendar GUI for composition of the new calendar event record even shown in FIG. 10. Upon selection of the "Save" option 418, the new calendar event record is stored in the calendar database in the flash memory 108 at the portable electronic device 100 and the calendar view returns to the default calendar view, which according to the present example is a day view. The calendar event record is displayed in the appropriate time period 366 according to the date and time defined in the "Start" field 402 and the "End" field 404, as shown in the calendar view of FIG. 12, listed with a starting time of 11:00 AM. Thus, the calendar event record is stored (step 300).

Storage of the calendar event record by composition at the portable electronic device is only one example of a method of storing a calendar event record. As indicated above, the calendar event record can be stored at the portable electronic device in other ways. For example, a calendar event record can be composed on the user's desktop computer 262a and stored in a calendar database at the data store 284. A corresponding copy of the calendar event record is wirelessly transmitted to the portable electronic device 100 for storage in the flash memory 108. Alternatively, a calendar event record can be composed on the user's desktop computer 262a and a corresponding copy is then transferred to the portable electronic device 100 by serial or USB connection, for example, by docking the portable electronic device 100 in the cradle 264. In yet another example, the calendar event record can be received at the portable electronic device in the form of an invitation to a meeting or other calendar event.

When a calendar event record is stored using any suitable method, the calendar event reminder is set and maintained at the portable electronic device 100. The reminder set in the present example is 15 minutes prior to the start time of 11:00

Figure 13:
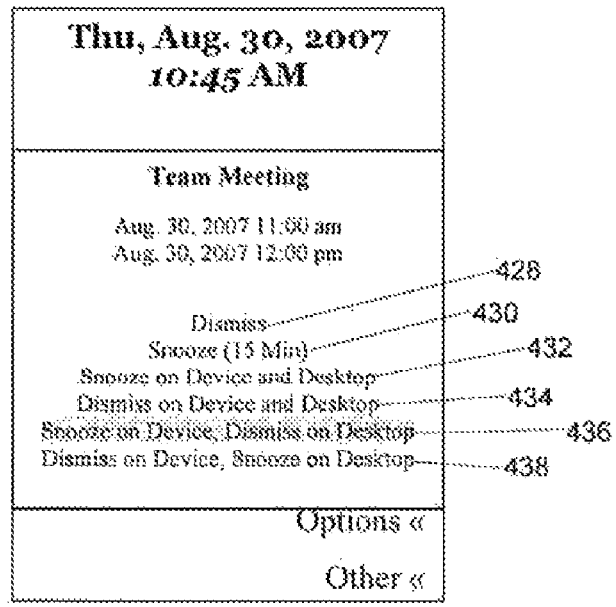

AM for the calendar event. Thus, the reminder is set for 10:45 AM and the reminder is triggered when it is determined that the time according to the internal clock at the portable electronic device 100 is equal to the time that the reminder is set for (step 314). Thus, at 10:45 according to the internal clock at the portable electronic device 100, the method proceeds to step 306. The user-configurable reminder options are then determined at step 306. The user-configurable reminder options include options provided to the user along with the calendar event reminder at step 308 and these options can vary. The options include, for example, user-selectable options relating to snoozing the reminder (to remind again later) and dismissing the reminder at the portable electronic device 100 and at the desktop computer 262*a*. The reminder is generated at step 307 and the options that are enabled are provided to the user along with the reminder at step 308. FIG. 13 is an exemplary screen shot showing the calendar event reminder generated for the "Team Meeting" calendar event stored at the portable electronic device 100 at step 300. As shown, a plurality of user-selectable options are provided including, the options to "Dismiss" 428, "Snooze" 430, "Snooze on Device and Desktop 432", "Dismiss on Device and Desktop" 434, "Snooze on Device, Dismiss on Desktop" 436, and "Dismiss on Device, Snooze on Desktop" 438. User selection of the "Dismiss" option 428 results in dismissal of the reminder at the portable electronic device 100 only. Selection of the "Snooze" option 430 resets the reminder to be generated again later. In the example shown in FIG. 13, selection of the "Snooze" option 430 resets the reminder to be generated again in 15 minutes. Selection of the "Snooze on Device and Desktop" option 432 results in resetting the reminder to be generated again later at the portable electronic device 100 and resetting a reminder to be generated again later for the corresponding calendar event record at the user's desktop computer 262*a*. Selection of the "Dismiss on Device and Desktop" option 434 results in dismissal of the reminder at the portable electronic device 100 and dismissal of a reminder for the corresponding calendar event record at the user's desktop computer 262*a*. Selection of the "Snooze on Device, Dismiss on Desktop" option 436 results in resetting the reminder to be generated again later at the portable electronic device 100 and dismissal of the reminder for the corresponding calendar event record at the user's desktop computer 262*a*. Selection of the "Dismiss on Device, Snooze on Desktop" option 438 results in dismissal of the reminder at the portable electronic device 100 and resetting the reminder to be generated again later for the corresponding calendar event record at the user's desktop computer 262*a*.

From the above description, it will be apparent that there are four options provided in the exemplary screen shot of FIG. 13 that include action to be taken at the user's desktop computer 262*a* in addition to the action to be taken at the portable electronic device 100. Further, two of the four options include an action to be taken at the user's desktop computer 262*a* that is different from the action to be taken at the portable electronic device 100.

The user-selection of one of the options provided at step 308 is received at step 310. User-selection of any one of the options is carried out by, for example, scrolling using the trackball 113 to the desired option followed by inward depression of the trackball 113 for selection. Upon receipt of the user-selection of the option, the main processor determines if there is an action to be taken at the user's desktop computer 262*a*. Thus, if one of the four options: "Snooze on Device and Desktop" 432, "Dismiss on Device and Desktop" 434, "Snooze on Device, Dismiss on Desktop" 436, and "Dismiss on Device, Snooze on Desktop" 438, are selected, it is determined at the portable electronic device 100 that an action is to be taken at the user's desktop computer 262*a* and the method proceeds to step 314. Otherwise, the method proceeds to step 316. At step 314, an update command is sent to the host computer system 250 for delivery to the message server 268 and storing in the associated data store. The update command is pushed to the mail client of the user's desktop computer 262*a* or polled from the data store by the user's desktop computer 262*a*. The update command includes a calendar event record identifier for taking the appropriate action at the user's desktop computer 262*a* in relation to the corresponding calendar event record at the desktop computer 262*a*.

At step 316, the action to be taken at the portable electronic device 100 is determined. In the present example, the calendar event reminder is either reset to be generated again later at the portable electronic device 100 (snooze) or is dismissed in each of the 6 options described. In the event that the calendar event reminder is reset to be generated again later at the portable electronic device 100 (snooze), the method proceeds to step 302 and the calendar event reminder time is set with a new time based on the snooze time. Thus if a default snooze time is set as 15 minutes, the reminder is set for 15 minutes after the time of receipt of the user-selection of the option at step 310. It will be appreciated that any suitable default reminder time is possible. The default reminder time can also be user-selected. Further, it is contemplated that reminder time options can be provided at the portable electronic device 100 upon selection of any one of the options that include a snooze (remind again later) at either the portable electronic device 100 or the user's desktop computer 262*a*. Thus, upon user-selection of any one of the options that includes a snooze (remind again later) at either device, a menu list of snooze times can be provided for user-selection in the calendar GUI.

Alternatively, if it is determined that the action to be taken at the portable electronic device 100 is to dismiss the reminder, the reminder is dismissed at step 318.

Referring still to FIG. 6 and to FIG. 13, particular examples of operation of the portable electronic device 100 will now be described. In the first example, the user is provided with the user-selectable options along with the reminder at step 308 and the user elects to dismiss the reminder at the device only. Thus, the user selects the "Dismiss" option. The user-selection is received at step 310 and at step 312 it is determined that no action is to be taken at the user's desktop computer 262*a*. Thus, the method proceeds to step 316 where it is determined that the user has selected the option to dismiss the reminder The reminder is then dismissed at the portable electronic device 100 at step 318. In this example, no action is taken at the user's desktop computer 262*a*.

In a second example, the user elects to snooze at the portable electronic device 100 only, to thereby have the portable electronic device 100 generate the reminder again later. Thus, the user selects the "Snooze" option 430 from the user-selectable options provided at step 308. The user-selection is received at step 310 and at step 312 it is determined that no action is to be taken at the user's desktop computer 262*a*. Thus, the method proceeds to step 316 where it is determined that the user has selected the option to generate the reminder again later. The method then returns to step 302 where the calendar event reminder time is set again based on the "snooze" time. If, for example, the snooze time is 15 minutes, as indicated in the "Default Snooze" field 440 of the exemplary screen shot of FIG. 14, the calendar event reminder is set for 15 minutes from the time of receipt of selection of the "Snooze" option 430 at step 308.

In a third example, the user selects the "Snooze on Device and Desktop" option 432. The user-selection is received at step 310 and at step 312 it is determined that an action is to be taken at the user's desktop computer 262a. At step 314, the portable electronic device 100 sends an update command to the host computer system 250 by, for example, wireless transmission. The update command includes a calendar event identifier for identifying the calendar event to which the update command belongs and a snooze time to reset the reminder to be generated again later at the user's desktop computer 262a. If, for example, the snooze time is 15 minutes at the portable electronic device 100, as indicated in the "Default Snooze" field 440 of the exemplary screen shot of FIG. 14, the update command includes a snooze time of 15 minutes for resetting the reminder for 15 minutes. The method then proceeds to step 316 where it is determined that the user has selected the option to be reminded again later at the portable electronic device 100. The method then returns to step 302 where the calendar event reminder time is set for the reminder to be generated again based on the "snooze" time.

In a fourth example, the user selects the "Dismiss on Device and Desktop" option 434. The user-selection is received at step 310 and at step 312 it is determined that an action is to be taken at the user's desktop computer 262a. At step 314, the portable electronic device 100 sends an update command to the host computer system 250 for updating the calendar event in the user's mail store and the user's desktop computer 262a. The update command includes a calendar event record identifier to identify the corresponding calendar event record at the user's desktop computer 262a and update the record by dismissing the reminder. Next, it is determined at step 316 that the user has selected the option to dismiss the reminder at the portable electronic device 100 and the reminder is dismissed at step 318.

In a fifth example, the user selects the "Snooze on Device, Dismiss on Desktop" option 436. The selection is received at step 310 and at step 312 it is determined that an action is to be taken at the user's desktop computer 262a. At step 314, the portable electronic device 100 sends an update command to the host computer system 250 for delivery to the user's desktop computer 262a. The update command includes a calendar event record identifier to identify the corresponding calendar event record at the user's desktop computer 262a for updating the record by dismissing the reminder. The method then proceeds to step 316 where it is determined that the user has selected the option to generate the reminder again later at the portable electronic device 100. The method then returns to step 302 where the calendar event reminder time is set again based on the "snooze" time.

In a sixth example, the user selects the "Dismiss on Device, Snooze on Desktop" option 438. The user selection is received at step 310 and at step 312 it is determined that an action is to be taken at the user's desktop computer 262a. At step 314, the portable electronic device 100 sends an update command to the host computer system 250 by, for example, wireless transmission. The update command includes a calendar event record identifier to identify the corresponding calendar event record at the user's desktop computer 262a and a snooze time to reset the reminder to be generated again later at the desktop computer 262a. If, for example, the snooze time is 15 minutes at the portable electronic device 100, as indicated in the "Default Snooze" field 440 of the exemplary screen shot of FIG. 14, the update command includes a snooze time of 15 minutes for resetting the reminder to be generated again in 15 minutes. The method then proceeds to step 316 where it is determined that the user has selected the option to dismiss the reminder at the portable electronic device 100 and the reminder is dismissed at step 318.

Figure 14:
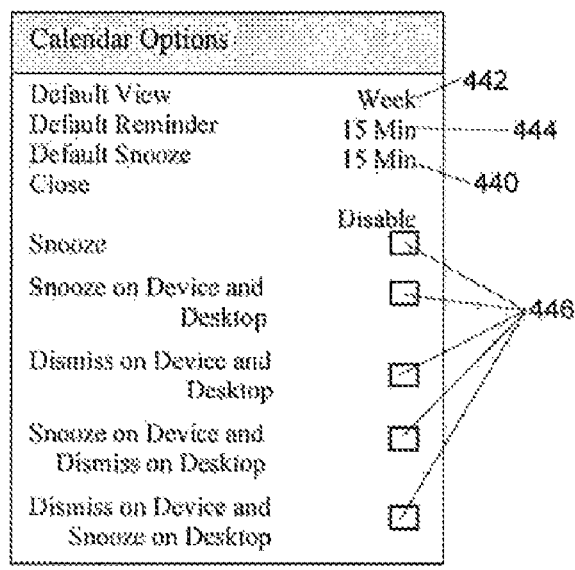
Figure 15:
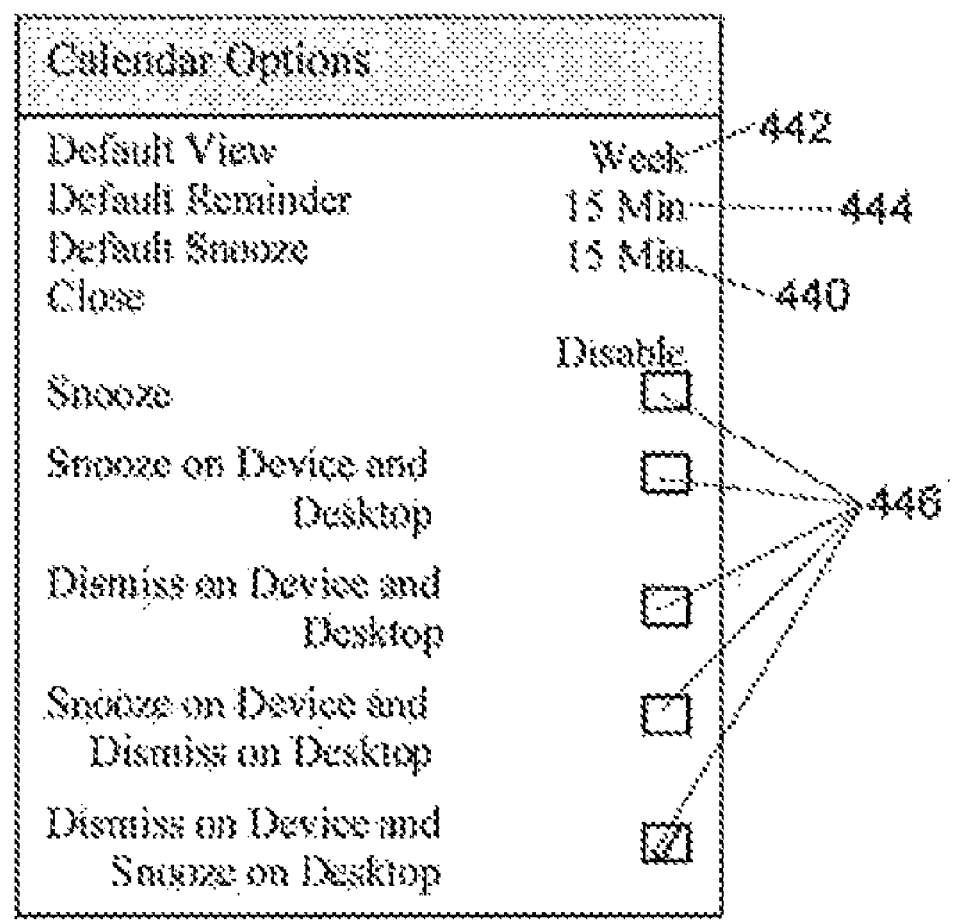

As indicated above, at step 306, the user-configured options are determined. The options provided when the reminder notification is generated are those options that are enabled. Thus, in the present example, a user can choose to disable certain options to be provided only those options that are enabled when the reminder is generated. FIG. 14 shows one exemplary screen shot including calendar options for user configuration. The calendar options can be displayed, for example, in response to user-selection of options from a calendar menu or submenu, such as the "Options" 392 provided in the menu shown in the exemplary screen shot of FIG. 9. In the exemplary screen shot of FIG. 14, there are many user-configurable options including a "Default View" 442, a "Default Reminder" 444, a "Default Snooze" 440, and user-selectable boxes 446 to disable any one of the "Snooze" option, the "Snooze on Device and Desktop" option, the "Dismiss on Device and Desktop" option, the "Snooze on Device, Dismiss on Desktop" option, and the "Dismiss on Device, Snooze on Desktop option. In the present example, any one of these options is disabled by user-scrolling to the desired user-selectable box using the trackball 113, followed by depression of the trackball 113 to check the box 446. Referring to the exemplary screen shot of FIG. 15, the option to "Dismiss on Device, Snooze on Desktop" is disabled. Disabled options are not provided along with the reminder at step 308.

It is contemplated that some or all of the options are not user-configurable. Thus, the user cannot choose to enable or disable these options. In the event that no options are user-configurable, all options programmed for the portable electronic device 100 are provided to the user and there is no determination of user-configured options as described above with reference to step 306. In this case, the method does not include step 306 and proceeds directly from step 304 to step 307 for user-selection of one of the options provided.

Each of the above examples are described with reference to a reminder notification and user-selectable options being provided at the portable electronic device 100. The present application is not limited to the reminder notification and user-selectable options being provided at the portable electronic device 100, however. It will be appreciated that the reminder notifications and user-selectable options can also be provided at, for example, the user's desktop computer. In this case, any action that is to be taken at the portable electronic device 100, for example, is sent via an update command to the calendar event data record at the portable electronic device 100. The update command can be, for example, provided to the message server 268 and pushed to the portable electronic device 100 by the management server 272.

In one aspect, there is provided a computer-implemented method of controlling reminders for an electronic calendar event record, the method including generating a reminder notification at a first electronic device, the reminder notification associated with the calendar event record, providing an option at the first electronic device for taking a first action at the first electronic device and taking a second action at a second electronic device, the first action differing from the second action, generating an update command at the first electronic device for taking the second action at the second electronic device in response to receipt of selection of the option at the first electronic device, and sending the update command from the first electronic device for the second electronic device.

In another aspect, there is provided an electronic device. The electronic device includes a housing, a display device exposed by the housing, an input device, a memory unit, a processor within the housing and connected to the memory unit, the input device, and the display device, and an application for execution by the processor for generating a reminder notification at the electronic device, the reminder notification associated with the calendar event record, providing an option at the electronic device for taking a first action at the electronic device and taking a second action at a further electronic device, the first action differing from the second action, generating an update command at the electronic device for taking the second action at the further electronic device in response to receipt of selection of the option at the electronic device, and sending the update command from the electronic device for the further electronic device.

In further aspect, there is provided a computer program product for an electronic device. The computer program product includes a computer-readable medium having computer-readable code embodied therein for generating a reminder notification at the electronic device, the reminder notification associated with a calendar event record, providing an option at the electronic device for taking a first action at the electronic device and taking a second action at a further electronic device, the first action differing from the second action, generating an update command at the electronic device for taking the second action at the further electronic device in response to receipt of selection of the option at the electronic device, and sending the update command from the electronic device for the further electronic device.

Reminder notifications generated at both the portable electronic device 100 and, for example, the user's desktop computer can be controlled from a single device such as the portable electronic device 100. An update command is sent from one device to the other and one of a plurality of options can be selected from. The update command that is generated as a result of receipt of selection of one of the options reduces processing as reminder notifications are reset for generation only at the desired device thereby limiting maintenance and generation of reset reminder notifications to a single device and avoiding unwanted reset reminder notifications. Further, reminder notification times are not maintained at a device where they are unwanted or unneeded, thereby saving processing, resulting in reduced power consumption and freeing up device memory for other uses.

In the preceding description, for purposes of explanation, numerous details are set forth in order to provide a thorough understanding of the embodiments of the present application. However, it will be apparent to one skilled in the art that certain specific details are not required. In other instances, features are shown in block diagram form in order not to obscure the description. For example, specific details are not provided as to whether the embodiments described herein are implemented as a software routine, hardware circuit, firmware, or a combination thereof.

Embodiments can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment. Those of ordinary skill in the art will appreciate that other instructions and operations necessary to implement the described features can also be stored on the machine-readable medium. Software running from the machine-readable medium can interface with circuitry to perform the described tasks.

The above-described embodiments are intended to be examples only. Alterations, modifications and variations can be effected to the particular embodiments by those of skill in the art without departing from the scope of the present application, which is defined solely by the claims appended hereto.

What is claimed is:

1. A computer-implemented method of controlling reminders for an electronic event record, the method comprising:
    displaying a reminder notification at a first electronic device, the reminder notification associated with the event record;
    displaying an option at the first electronic device for taking a first action for the reminder notification at the first electronic device; and
    sending from the first electronic device an update command for a second electronic device, the update command for taking a second action at the second electronic device in response to receipt of selection of the option at the first electronic device, the first action differing from the second action.

2. The method according to claim 1, comprising maintaining at the first electronic device, the electronic event record.

3. The method according to claim 2, comprising setting and maintaining a calendar event reminder time for displaying the reminder notification.

4. The method according to claim 3, wherein the displaying the option is carried out when a current time according to a portable electronic device clock is equal to the calendar event reminder time.

5. The method according to claim 1, wherein displaying the option comprises displaying an option to display the reminder notification again later at the first electronic device and dismiss the reminder notification at the second electronic device.

6. The method according to claim 1, wherein displaying the option comprises displaying an option to dismiss the reminder notification at the first electronic device and to display the reminder notification again later at the second electronic device.

7. The method according to claim 1, comprising displaying a further option at the first electronic device to dismiss the reminder notification at both the first electronic device and the second electronic device.

8. The method according to claim 1, comprising providing a further option at the first electronic device to display the reminder notification again later at both the first electronic device and the second electronic device.

9. The method according to claim 1, comprising taking the first action at the first electronic device in response to receipt of selection of the option.

10. The method according to claim 1 wherein sending the update command comprises wirelessly transmitting the update command from the first electronic device.

11. The method according to claim 1, wherein the option for taking a first action is displayed in response to determining that the option is enabled.

12. An electronic device comprising:
    a housing;
    a display;
    an input device;

a processor within the housing and coupled to the input device and the display to:
  display a reminder notification on the display, the reminder notification associated with an electronic event record;
  display an option on the display for taking a first action for the reminder notification; and
  send an update command for a second electronic device, the update command for taking a second action at the second electronic device in response to receipt of selection of the option, the first action differing from the second action.

13. A computer program product for an electronic device, the computer program product comprising a computer-readable medium having computer-readable code embodied therein for displaying a reminder notification at a first electronic device, the reminder notification associated with an electronic event record, displaying an option at the first electronic device for taking a first action for the reminder notification at the first electronic device, and sending from the first electronic device an update command for a second electronic device, the update command for taking a second action at the second electronic device in response to receipt of selection of the option at the first electronic device, the first action differing from the second action.

* * * * *